No. 867,849. PATENTED OCT. 8, 1907.
R. H. STOKER.
PUMP.
APPLICATION FILED JAN. 17, 1906.

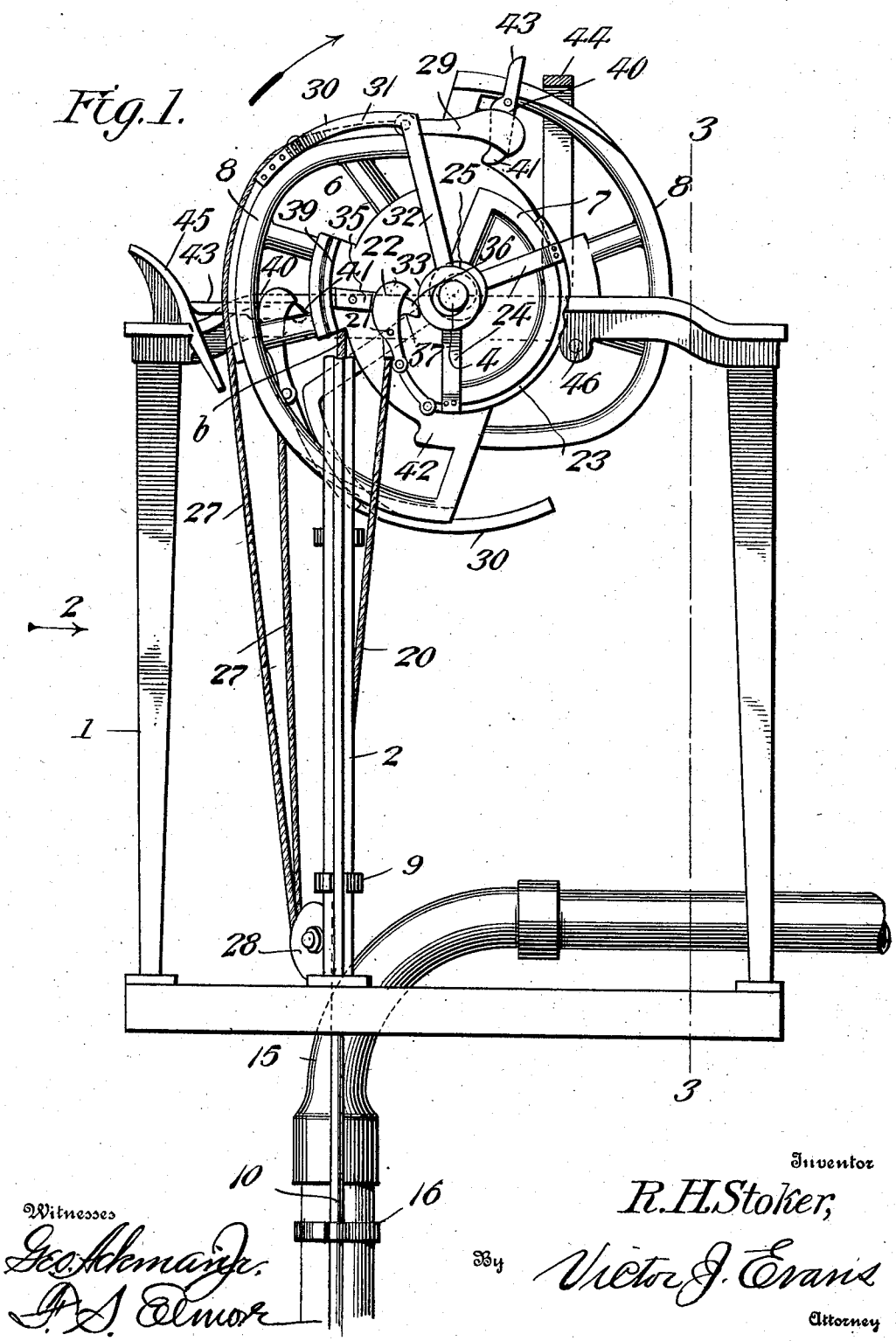

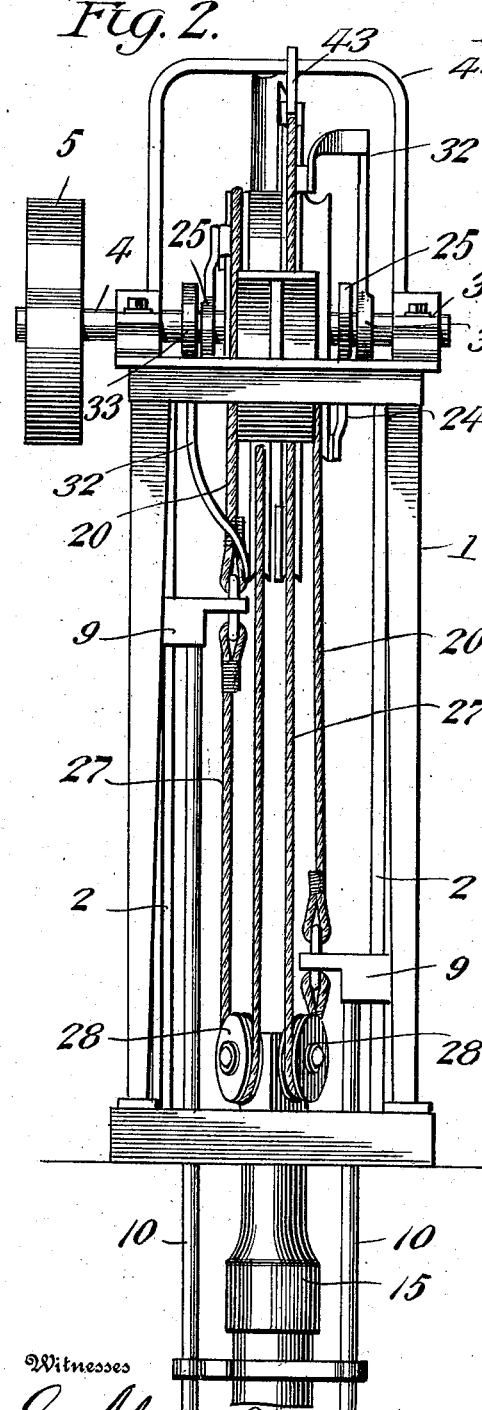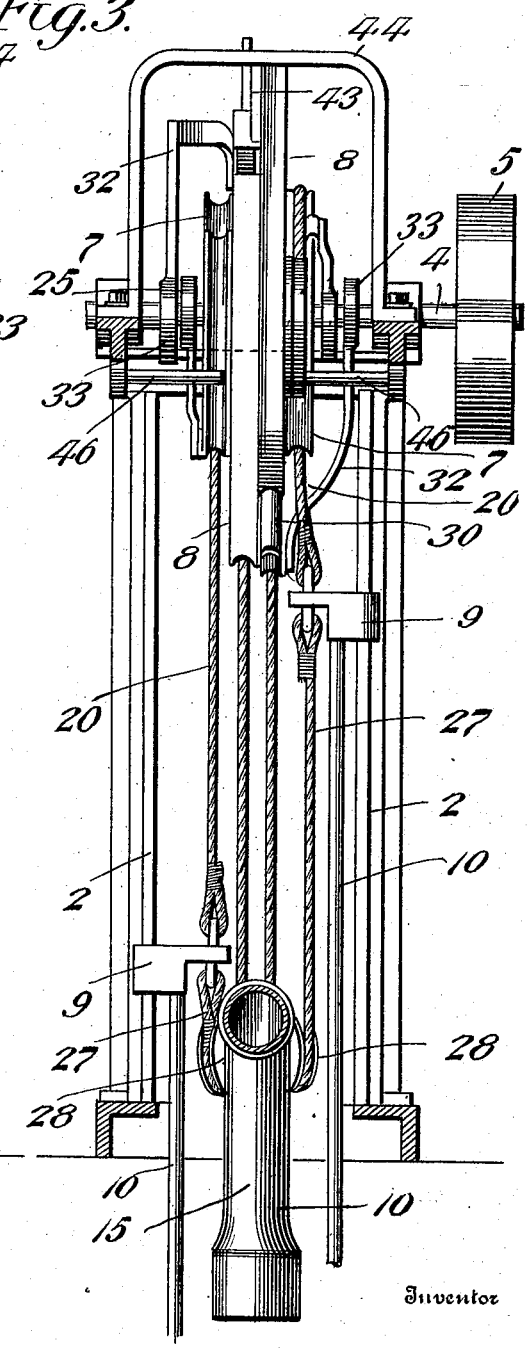

5 SHEETS—SHEET 3.

Witnesses
Geo. Ackman Jr.
J. A. Elmore

Inventor
R. H. Stoker,
By Victor J. Evans
Attorney

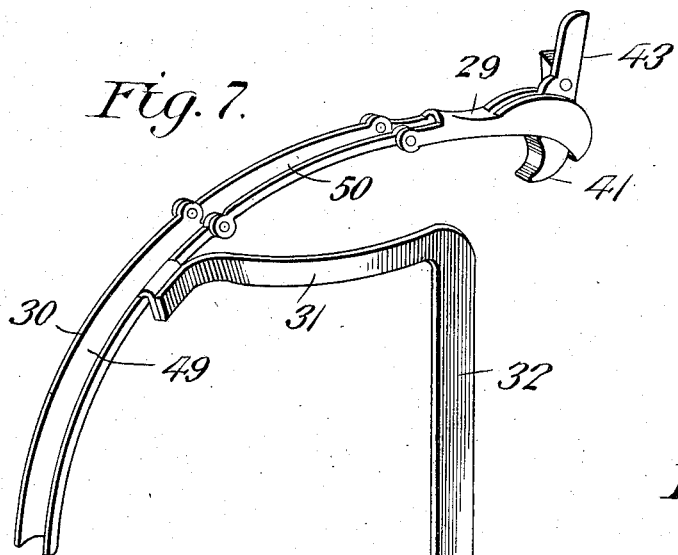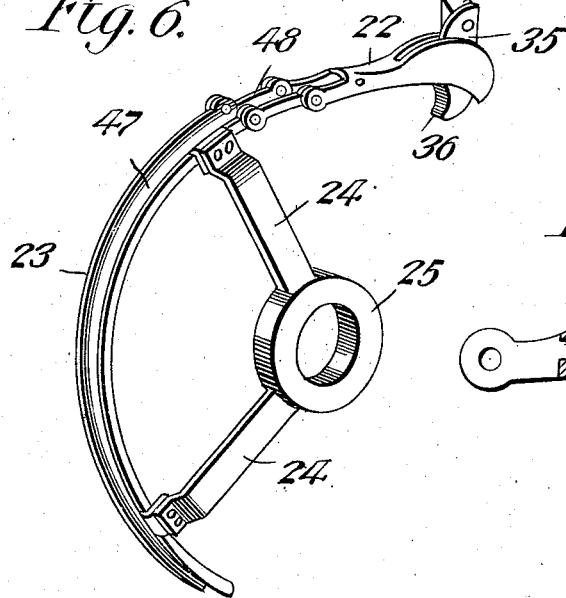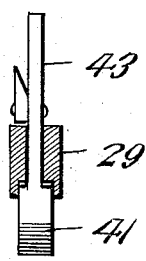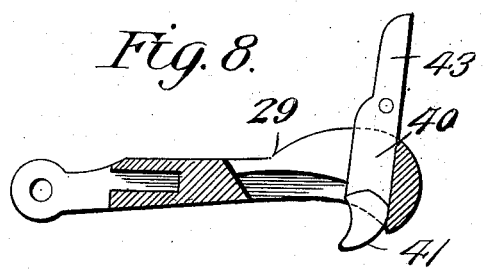

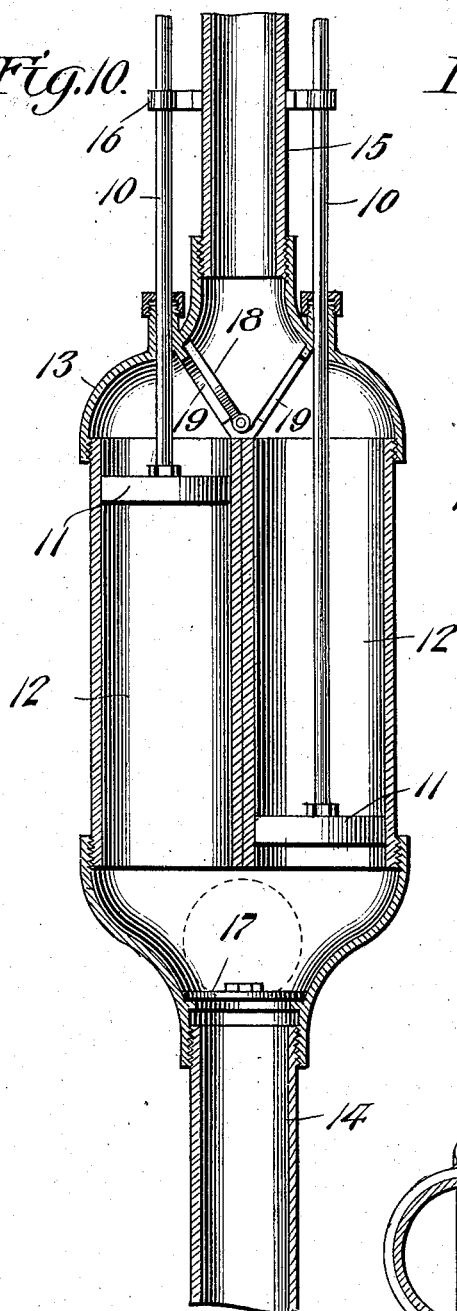
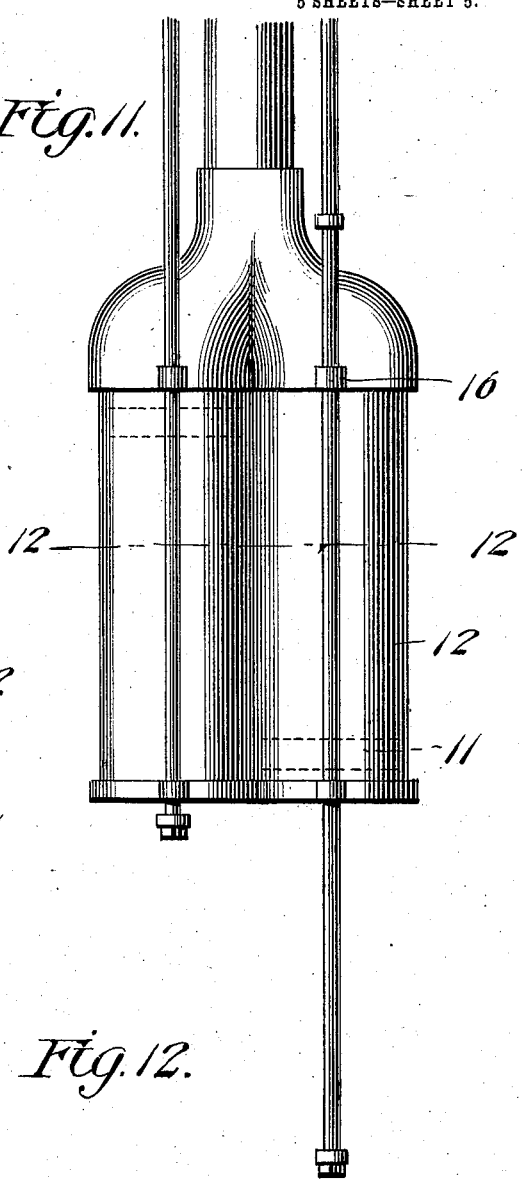
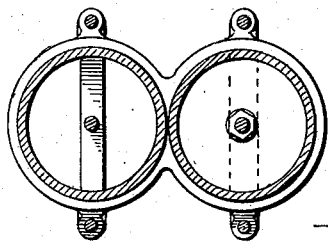

UNITED STATES PATENT OFFICE.

ROBERT H. STOKER, OF HOUSTON, OHIO.

PUMP.

No. 867,849.   Specification of Letters Patent.   Patented Oct. 8, 1907.

Application filed January 17, 1906. Serial No. 296,526.

*To all whom it may concern:*

Be it known that I, ROBERT H. STOKER, a citizen of the United States, residing at Houston, in the county of Shelby and State of Ohio, have invented new and useful Improvements in Pumps, of which the following is a specification.

This invention relates to pumps of the double acting type embodying in its organization a pair of cylinders containing movable pumping members or pistons, and has for its objects to produce a comparatively simple device of this character which may be readily installed for use, one wherein the pistons will be so operated as to insure a constant and steady flow of water, and one in which the volume of water lifted by the pistons will, for a given amount of power, be materially increased.

Further objects of the invention are to provide a device of this class in which the number of parts are reduced to a minimum, one which will be practically noiseless in action, and one wherein uneven, jerky movement of the pumping pistons with consequent straining and wearing of the pumping mechanism is obviated.

A further object of the invention is to provide a device of this character in which the pistons will travel slowly and with increased power during ascending or lifting movement and rapidly during the descending movement, and one wherein this change of speed in the ascending and descending strokes of the pistons will occur without producing a jerky or jarring motion of the pistons or their operating mechanism.

With these and other objects in view the invention comprises the novel features of construction and combination of parts more fully hereinafter described.

Figure 4:
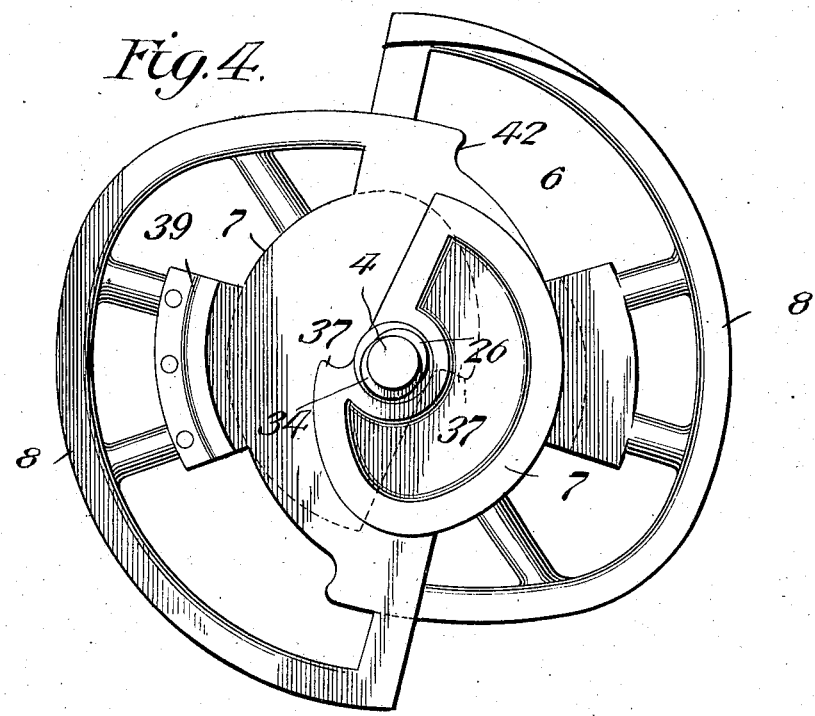
Figure 5:
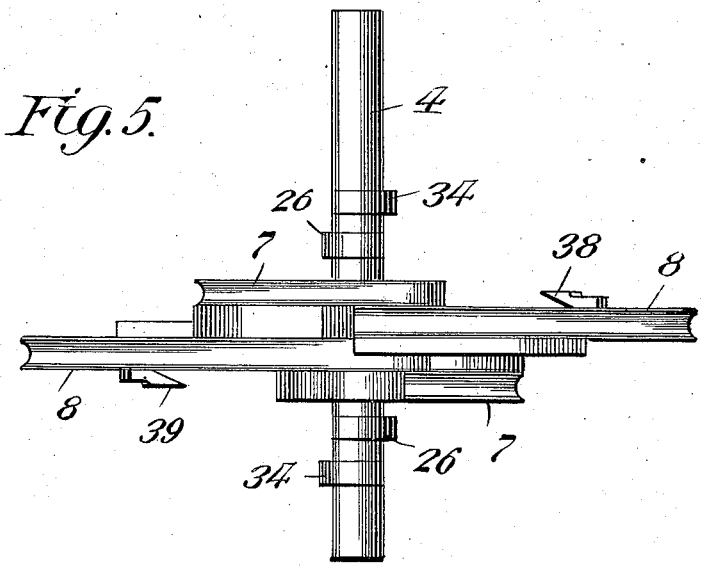

In the accompanying drawings: Figure 1 is a side elevation of the upper portion of a pump equipped with an operating mechanism embodying the invention. Fig. 2 is an end elevation of the same viewed in the direction of the arrow in Fig. 1. Fig. 3 is a vertical sectional view taken on the line 3—3 of Fig. 1. Fig. 4 is an enlarged side elevation of the rotary pumping head. Fig. 5 is a top plan view of the same. Fig. 6 is a detail, perspective view of one of the primary coupling members and guides. Fig. 7 is a similar view of one of the secondary coupling members and guides. Fig. 8 is an enlarged detail view partly in section of one of the sectional coupling members. Fig. 9 is a detail cross sectional view of the same. Fig. 10 is a vertical section centrally and longitudinally through the lower portion of a suction pump provided with pistons adapted for operation by my improved mechanism. Fig. 11 is a similar view of a modified form of pump to be operated by said mechanism. Fig. 12 is a horizontal section taken on the line 12—12 of Fig. 11.

Referring to the drawings, 1 designates a frame or super structure provided with vertical guide members or standards 2 and having bearings 3 in which is jour- naled a horizontal rotary shaft 4 equipped with a belt pulley 5, there being fixed upon and for rotation with the shaft 4 a pumping head 6 preferably cast in one piece and presenting a pair of primary cams 7 and a pair of secondary cams 8 arranged in pairs respectively at opposite sides of the head, it being noted that the cams are disposed at substantially diametrically opposite points in the cycle of rotation of the head.

Arranged for movement respectively upon the guides 2 is a pair of head members or blocks 9 in turn fixed upon the upper ends of vertical, reciprocatory pump rods 10 equipped at their lower ends with pistons 11 arranged for operation in the cylinders 12 of a pump casing 13 having coupled to its lower end a suction pipe 14 and to its upper end a discharge pipe 15 carrying suitable guides 16 for the pump rods, there being arranged in the lower end of the casing 13 over the inlet pipe 14 an inlet valve 17 and in the upper end of the casing a cut-off valve 18 adapted to alternately close the ports 19 leading from the cylinders 12 to the discharge pipe 15.

Connected with each of the head blocks 9 is one end of a flexible lifting element or cable 20, having its other end connected as at 21 to a primary coupling member 22 pivoted to the forward end of a segmental guide 23 sustained by the radial bearing arms 24 of an annular bearing member or collar 25 having bearing upon an eccentric cam 26 provided on the shaft 4, there being also connected with each of the head blocks 9 one end of a lowering element or cable 27 arranged for travel over a guide pulley 28 suitably journaled at the bottom of the frame 1 and having its other end engaged with a secondary coupling member 29 pivoted to the forward end of a guide 30 in turn carried by the lateral off-set portion 31 of an arm 32 having an annular bearing member or collar 33 arranged for rotation on an eccentric cam 34 formed on the shaft 4, it being observed that the cams 26 and 34 are disposed relatively at diametrically opposite points in the cycle of rotation of the shaft, and furthermore, that the guides 23 are curved to conform to the peripheries of the primary cams 7, while the guides 30 in like manner conform to the secondary cams 8.

Pivoted in each of the primary coupling members 22 is a locking member or dog 35 having an angularly bent engaging end 36 adapted for engagement with an undercut terminal engaging portion or keeper 37 at the inner end of the adjacent primary cam 7, there being provided at the outer end of the dog 35 a beveled block 38 formed to engage beneath an undercut or beveled guideway 39 on the head 6, while pivoted in each of the coupling members 29 is a locking member or dog 40 having an angular engaging portion 41 to engage an undercut engaging portion or keeper 42 at the inner end of the corresponding cam portion 8, the dogs 40 being provided at their outer ends with longitudinal extensions or arms 43, for a purpose which will presently appear. Provided on the super structure 1 is an abutment 44 with which the arms 43 contact for tripping the locking members 40 to release the cables 27 from their cams, these members being moved to engaging position through contact with a downwardly and inwardly inclined cam portion or abutment 45 also provided on the super structure, while the locking members 35 which are maintained in engaging position through the medium of the guides 39 are moved to releasing position by contact with a pin or abutment 46 sustained in the frame 1 within the path of the outer ends of the members.

The segmental guides 23, which are provided with grooves 47 to receive the cables 20, are connected with the coupling members 22 by flexible portions or links 48, while the secondary guides 30 are in like manner provided with cable receiving grooves 49 and are connected to the coupling members or heads 29 by flexible portions or links 50, it being apparent that under this arrangement the coupling heads and their respective guides are susceptible of relative movement in a direction radially of the cams for a purpose presently explained.

In practice, the shaft 4 is driven from any suitable source of power transmitted by a belt traveling on the pulley 5 for rotating the head 6 in the direction indicated by the arrow in Fig. 1. As the head 6 revolves the coupling members 22 will be successively engaged with their respective primary cams 7 owing to engagement of the locking dogs 35 with the engaging portions 37 whereby the cables 20 will be wound alternately upon said cams for raising the pump rods 10 to force the water upward through the discharge pipe 15, it being understood that at the completion of the upward stroke of each piston, the corresponding operating cable 20 will be released owing to contact of the adjacent dog 35 with the abutment 46, as before explained. Simultaneously with the release of each of the coupling members 22, the corresponding coupling member 29 will be engaged with the appropriate cam 8 owing to interengagement of the appropriate locking member 40 and engaging portion 42, whereby the cables 27 will be successively wound upon the cams 8 for drawing the pump rods downward, it being understood that at the completion of the down stroke of each piston its cable 27 will be released owing to contact on the arm 43 of the corresponding locking dog with the abutment 44. It is to be noted that the cams 7 and 8 of each pair are oppositely disposed and act alternately upon their respective cables 20 and 27 for raising and lowering the adjacent pump rod, and further that the arrangement of the two sets or pairs of cams is such that the rods will be alternately raised and lowered, or in other words, that during the ascent of one of the piston rods the other rod will be on the descending stroke, whereby a continuous flow of water upward through the discharge pipe maintained, and further that when one of the cables is released at the completion of either the ascending or descending stroke the bearings 25 or 33 in rotating upon the adjacent cams 26 or 34 serve to move the cable guides 23 or 30 radially outward from their operating cams, thus minimizing friction on the parts and reducing the power necessary for operating the device. Upon return of the cables 27 to initial position the arms 43 contact with the inclined abutment 45 and are acted upon thereby for holding the engaging portions 41 of the locking dogs 40 in the path of and to be picked up by the engaging portions 42 of the cams 8, while the locking members 35 will be maintained in proper position for engagement with the portions 37 of the cams 7 through the medium of the engagement of the plugs 38 with the guides 39. It will be noted that owing to the ascending strokes of the pump rods being effected by the smaller cams 7 and the descending strokes by the larger cams the rods will have a comparatively slow ascending and a rapid descending movement, while at the same time the lifting power on the rods will be double that of the descending power, and furthermore, that the changes of speed from the ascending to the descending strokes of the pistons will be effected without subjecting the parts to shocks and without causing an uneven, jerky movement on the rods and this owing to the fact that upon the engagement of one of the lifting cables with its operating cam the companion lowering cable is simultaneously released.

From the foregoing it is apparent that I produce a simple device admirably adapted for the attainment of the ends in view, it being understood that in attaining these ends minor changes in the details herein set forth may be resorted to without departing from the spirit of the invention.

Having described my invention, what I claim as new is:

1. In a device of the class described, a reciprocatory pumping member, a pumping head having raising and lowering cams provided with engaging portions, flexible operating elements connected with the pumping member, coupling heads connected respectively with said elements and provided with movable locking dogs adapted for engagement respectively with the engaging portions of the separate cams, and means for moving the dogs alternately to and from engaging position at determined intervals for operatively connecting the elements with their respective operating cams.

2. In a device of the class described, a reciprocatory pumping member, a rotary pumping head having raising and lowering cams, a pair of flexible operating elements connected with the pumping member and adapted for operation by the cams, movable locking dogs connected with the elements and formed for engagement with the cams, and an abutment disposed in the path of the dogs for moving them alternately to and from engaging position.

3. In a device of the class described, a reciprocatory pumping member, a frame, a rotary shaft journaled in the frame and carrying a pumping head provided with raising and lowering cams, grooved guide members adapted to conform to the peripheries of the cams, coupling members carried by the guides and having movable devices for engagement with the cams, a pair of flexible operating elements connected with the pumping member and engaged respectively with the guide members, means for alternately and successively moving the devices to and from engaging position, and means for moving the guides away from the cams upon movement of the devices to releasing position.

In testimony whereof, I affix my signature in presence of two witnesses.

ROBERT H. STOKER.

Witnesses:
EMMA L. FLINN,
NETTIE GAINES.